United States Patent [19]

Hamilton et al.

[11] 3,735,235

[45] May 22, 1973

[54] DC TO DC CONVERTER WITH VOLTAGE REGULATION FEEDBACK LOOP ACHIEVING ISOLATION BETWEEN INPUT AND OUTPUT BY TIME DOMAIN TECHNIQUES

[75] Inventors: Billy Harold Hamilton, Summit; Helmut Wilhart, Whippany, both of N.J.

[73] Assignee: Bell Telephone Laboratories, Incorporated, Murray Hill, Berkeley Heights, N.J.

[22] Filed: Oct. 19, 1971

[21] Appl. No.: 190,594

[52] U.S. Cl. ............................321/2, 321/18, 321/47
[51] Int. Cl. ...............................................H02m 3/32
[58] Field of Search..............................321/2, 18, 47

[56] References Cited

UNITED STATES PATENTS

| | | | |
|---|---|---|---|
| 3,526,823 | 9/1970 | Genuit | 321/2 |
| 3,506,904 | 4/1970 | Sikorra | 321/2 |
| 3,582,758 | 6/1971 | Gunn | 321/47 |
| 3,602,801 | 8/1971 | Williamson | 321/2 |
| 3,432,737 | 3/1969 | Hunter et al. | 321/2 |
| 3,418,557 | 12/1968 | Schaefer | 321/18 |

OTHER PUBLICATIONS

Electronic Design, "Anatomy of Low Input–Voltage DC–DC Converter," June 21, 1963.

Primary Examiner—William H. Beha, Jr.
Attorney—R. J. Guenther and William L. Keefauver

[57] ABSTRACT

A DC to DC converter includes a digital type voltage regulation control circuit which permits complete isolation between the input and output circuits. The regulation signals comprise timing pulses coupled by a pulse transformer from voltage monitoring circuitry on the output side of the converter to switching control circuitry on the input side of the converter.

The rectifier of the converter utilizes synchronous rectifying transistors driven by a proportional base drive arrangement which utilizes the regenerative action of a current transformer to transform the collector current of the transistor into a base drive current. This proportional base drive arrangement includes a third stored charge sweep-out winding and a diode to permit high frequency operation of the converter rectifier with low voltage high current saturation transistors.

9 Claims, 4 Drawing Figures

3,735,235

DC TO DC CONVERTER WITH VOLTAGE REGULATION FEEDBACK LOOP ACHIEVING ISOLATION BETWEEN INPUT AND OUTPUT BY TIME DOMAIN TECHNIQUES

BACKGROUND OF THE INVENTION

This invention relates to the voltage regulation of DC to DC converter circuits. It is more specifically concerned with the application of digital techniques to voltage regulation and to achieving isolation between the input and output sides of the converter. It particularly concerns a circuit which is suitable for embodiment in modular form. It more specifically is also concerned with efficient synchronous rectification in low voltage high output current converters.

The utilization of integrated circuit technology is desirable in the manufacture of circuits which are used in large quantities. By embodying the circuits in an integrated circuit form, many savings in production costs can be realized. The integrated circuit form in many instances produces a circuit that is smaller in size and more reliable than a comparable circuit utilizing the conventional lumped components. A converter circuit cannot be completely embodied in the integrated circuit form since the converter transformer cannot be embodied in an integrated circuit form. While substitute circuit arrangements can be substituted for the transformer in some instances, in general a converter circuit requires a transformer to achieve isolation between its input and output circuits. Hence, two separate integrated circuit chips normally are required on each side of a transformer in a converter circuit.

The voltage regulation precision of the typical converter circuit is limited. Hence, in situations requiring a very precise regulated voltage, an auxiliary voltage regulation circuit must be coupled with the converter. A typical voltage regulation circuit suitable for application to regulate the voltage output of converter circuits monitors the converter output voltage and generates a feedback signal which is utilized to modulate the duty cycle of the inverter switching devices included on the input circuit side of the converter.

It is desirable to use digital type control techniques and to embody the voltage regulator circuitry on the same chips on which the converter circuit is embodied. Since the voltage regulation circuit interconnects the input and output sides of the converter, an electrical isolating device must be included in the feedback path. This isolation is necessary because converter circuits typically are designed to operate with different input and output ground connections. This is particularly important where the polarity of the voltage is inverted. In addition, the isolation grants protection to the input side circuitry from output voltage disturbances.

It is desirable to generate a complete control signal on the output side of the converter so it is immediately responsive to the voltage which is regulated. However, this raises problems as to how to energize the regulator circuitry on the output side of the converter. It is fairly straightforward to derive analog signals to send back to the input of the converter, however, the power requirements of transmitting the analog signals may require a cumbersome isolation device to couple the input and output sides of the converter. In the case of a transformer used as the isolation device, a large magnetic core may be required. Digitally encoded signals on the other hand have a substantially lower power requirement but the generation of these signals requires complex circuitry.

The low voltage on the output side of a converter to supply very low voltages of 5 volts or less is too low to operate conventional rectifying diodes with reasonable efficiency. It is more efficient to use controlled switching transistors as the rectifying devices. However, the switching of the transistors may require complex control circuitry having power requirements which impair the efficiency of operation of the converter. The switching may be controlled by utilizing a transformer to transform the collector current of the rectifying transistor into a base drive current. Such an arrangement is disclosed by John B. Gunn in U.S. Pat. No. 3,582,758 issued June 1, 1971. This circuit is limited to low frequency operation of 60 hertz because of the large storage time to dissipate stored charge in the low voltage transistors.

It is, therefore, an object of the invention to efficiently regulate the output voltage of a DC to DC converter by digital control techniques.

It is another object of the invention to isolate the input and output circuits of a voltage regulated DC to DC converter including isolation in the voltage regulation feedback path.

It is yet another object to improve the efficiency in controlling the transistor synchronous rectifiers in a low output voltage DC to DC converter and permit operation at higher frequencies.

SUMMARY OF THE INVENTION

Therefore, in accordance with the invention, the voltage output of a DC to DC converter is regulated by means of a pulse-type feedback signal which modulates the duty cycle of the converter's transistor switches. This pulse signal is delayed with respect to a time reference in response to a voltage error signal. This error signal is generated in response to a comparison of the output voltage of the converter with a reference voltage. Isolation is achieved by including a pulse transformer in the feedback path of the voltage regulator circuitry. The regulation functions are divided into two functional units which may be included on two integrated circuit chips common to the input and output sides of the converter, respectively. The division of these functions is advantageously arranged so that the switching control on the input side of the converter can operate independently of the feedback signals generated on the output side. This insures positive starting of the converter circuit at all times.

The voltage regulator circuitry comprises a pulse-width modulating circuit to generate a width modulated pulse whose duration is responsive to an error sensing circuit which compares the converter output voltage to a reference voltage. This width modulated pulse is initiated in response to a synchronizing pulse derived at the output side from the switching transistor on the input side. A timing pulse is generated coincident with the termination of the width modulated pulse. These timing pulses are coupled to the switching control on the input side of the converter by a pulse transformer.

A feature of the invention is a proportional base drive arrangement to drive the synchronous transistors in the rectifier on the output side of the converter at higher frequencies than formerly possible. The base drive signals to bias the synchronous rectifying transistors into a saturated conducting state are generated by transforming the output current of the same rectifying transistor into a base drive current by means of a current transformer included in the collector circuit of the rectifying transistor. This transformer includes an additional winding which advantageously transforms turn-off control signals to a signal to sweep out stored charge in the synchronous rectifying transistors. This signal may be applied from the input side of the converter without adversely disturbing the isolation between the input and output sides of the converter. A diode shunting the rectifying transistor and poled in the forward current direction of the transistor advantageously utilizes the initial momentary flyback current of the converter to precondition turn-on of the rectifying transistor and permit operation at higher frequencies.

DESCRIPTION OF THE DRAWING

An understanding of the invention may be readily ascertained by referring to the following detailed description which describes an illustrative embodiment of the invention and refers to the accompanying drawings in which.

DETAILED DESCRIPTION

Figure 1:
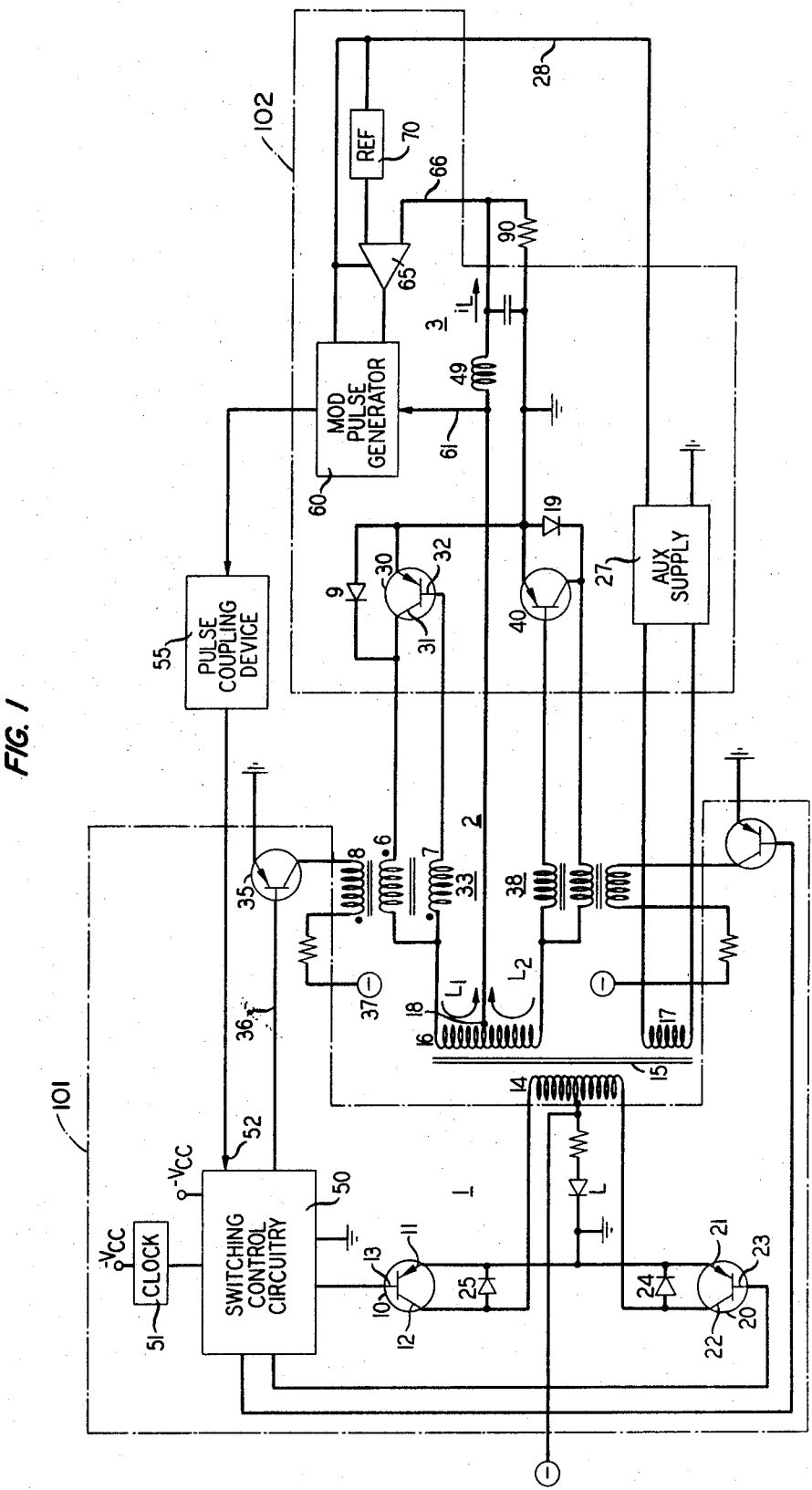
FIG. 1 is a combined schematic and block diagram of a DC to DC converter including voltage regulation circuitry according to the invention.

A low voltage high current output DC to DC converter is shown in FIG. 1. This converter includes voltage regulation circuitry to precisely regulate the output voltage of the converter. The converter is designed in accordance with the principles of the invention so that the input and output sides are completely isolated from each other. The DC to DC converter comprises three major stages; an inverter stage 1, a rectifier stage 2, and a voltage regulation stage 3. This circuitry may be, with the exception of the transformers disclosed, realized in integrated circuit form. The circuit may be embodied into two integrated circuit chips such as shown by the dotted line enclosures 101 and 102 in FIG. 1; In the circuit shown in FIG. 1 the inverter stage and part of the voltage regulation stage may be contained on one integrated circuit comprising the circuitry enclosed by the dotted line 101 on the input side of the converter. The rectifier and the balance of the voltage regulation stage may be contained on a second integrated circuit comprising the circuitry enclosed by the dotted line 102 on the output side of the converter.

The inverter stage of the converter comprises two primary switching transistors 10 and 20. The switching transistors 10 and 20 have their emitter electrodes 11 and 21 grounded and their collector electrodes 12 and 22 connected to the opposite terminals of the transformer winding 14 of the inverter transformer 15. The switching of transistors 10 and 20 is controlled by a switching control circuit 50 which is connected to the base electrodes 13 and 23.

The switching control circuit 50 is located on the input side of the converter and may be included on the same integrated circuit chip indicated by the dotted line 101 as are the switching transistors 10 and 20. The switching signal output of the switching control circuit 50 is synchronized to a clock pulse source 51. In the absence of voltage regulation control signals, the switching control circuit is designed to operate the switching transistors 10 and 20 at some arbitrary maximum duty cycle. This maximum duty cycle is set at some value less than 100 percent in order to prevent simultaneous conduction of current in the switching transistors 10 and 20 due to stored charge therein. The diodes 25 and 24 shunt the collector emitter paths of the switching transistors 10 and 20, respectively, and are poled to prevent reverse voltage spikes across these transistors at the end of their conduction intervals.

Figure 2:
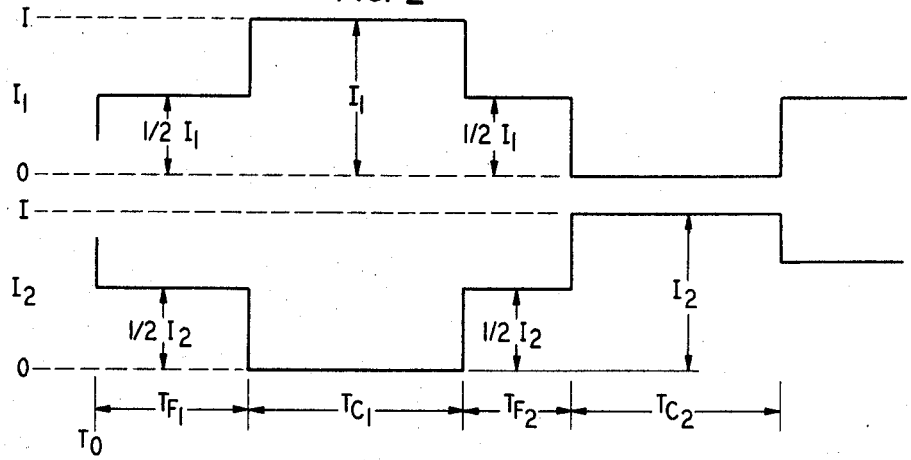
FIG. 2 shows voltage wave forms which assist in explaining the operation of the synchronous rectifying transistors included in the converter.

The output winding 16 of the inverter transformer 15 is connected to the rectifier 2. The rectifier 2 comprises two synchronous rectifying transistors 30 and 40 which are coupled to the opposite terminals of the output winding 16. The winding 16 has a center tap 18 which is coupled to the output load 90 via the output filter inductor 49. The waveforms of the rectified currents $I_1$ and $I_2$ conducted by transistors 30 and 40 are shown in FIG. 2.

The collector emitter paths of the synchronous rectifying transistors 30 and 40 are each shunted by the diodes 9 and 19 respectively. The diodes 9 and 19 are poled in the same direction as the forward conduction direction of the rectifying transistors 30 and 40. The diodes 9 and 19 are poled in this direction in order to provide a momentary path for the flyback current induced by the filter inductor 49. The momentary flyback current turns on the synchronous rectifying transistor which then conducts the balance of the flyback current. The flyback current conducted by the transistors 30 and 40 is shown in FIG. 2 during the time periods $T_{f_1}$ and $T_{f_2}$. This flyback current is divided evenly between each half of the center tapped winding 16 and flows through each of the synchronous rectifying transistors 30 and 40. The flyback current is combined at the center tap 18 and flows through the filter inductor 49 to the output load 90. The main commutated current during the time periods $\bar{T}_{c_1}$ and $T_{c_2}$ flows through only one of the synchronous rectifying transistors. The nonconducting transistor during this period is cut off as shown in FIG. 2.

The rectifying transistors 30 and 40 are selected having characteristics wherein the transistor saturates at a very low voltage. The rectifying transistors are used in the low voltage high current output rectifier because the conduction losses in utilizing conventional diodes at the low voltage high current output would make the operation of the rectifier extremely inefficient.

Current transformers 33 and 38 are included in the collector circuits of the rectifying transistors 30 and 40, respectively. These transformers are identical and each include a winding connected to the base of the rectifying transistor so that the synchronous rectifying transistor can be turned on without requiring an externally applied base drive signal. These current transformers 33 and 38 are preferably designed so that the voltage induced across the winding connected to the collectors is very small compared to the voltage across the output winding 16. Transformer 33 has a first winding 6 which interconnects the collector 31 of transistor 30 to winding 16. A second winding 7 interconnects the base 32 of transistor 30 to winding 16. The winding 6 and the winding 7 are magnetically coupled and oriented as indicated by the dot notation on FIG. 1. A third winding 8 is utilized to supply the turnoff signals to transistor 30 from the input side of the converter. The third winding 8, as described below, permits the rectifier to operate at high frequencies.

Utilization of this transformer base drive arrangement advantageously derives a base drive current for the synchronous rectifying transistor 30, which is a constant fraction of its collector current. Hence, the base drive current is automatically controlled to be the exact amount needed by the synchronous rectifying transistor. Initially, at time $T_0$, a momentary flyback current flows through the diode 9. The momentary flyback current flowing through diode 9 flows through the transformer winding 6. The flyback current flowing through winding 6 induces a base drive current in the winding 7. In response to the induced base drive current in winding 7, the nonconducting synchronous rectifying transistor 30 is biased into a conducting state, wherein it conducts the flyback current ½ $I_1$ during time period $T_{f_1}$ and subsequently the current $I_1$ during time period $T_{c_1}$.

By utilizing the flyback diodes 9 and 19 as described, the turn-on speed of the rectifying transistors 30 and 40 is greatly increased and hence the rectifier may operate at much higher frequencies. The level of the base drive current varies automatically to meet the instantaneous drive requirements of the synchronous rectifying transistor. Since the base drive current in winding 7 is coupled to transformer winding 16, the dissipation of this base drive current takes place in the output load 90 and forms part of the regulated output signal of the converter. The output load 90, in turn, advantageously functions as a current limiting resistor to limit the base drive current of the synchronous rectifying transistors.

A positive turn-off signal is applied, via winding 8, to the base 32 of the synchronous rectifying transistor to rapidly sweep out the stored charge therein and permit high frequency operation. The turn-off signal is generated in response to the switching control circuit 50 on the input side of the converter. This turn-off signal reverse biases the synchronous rectifying transistor 30 to maintain it in its cut-off condition during the time interval $T_{c_2}$. The application of this signal through winding 8 advantageously permits isolation between the switching control circuit on the input side of the converter and the rectifying transistor on the output side of the timer.

The switching control circuit 50 initiates the turn-off of the rectifying transistor 30 by applying a control signal to the base 36 of transistor 35 to bias it into a conducting condition. With the transistor 35 conducting a current flows from ground to the negative voltage source at terminal 37. The current flow through the transformer winding 8 induces a current in the winding 7. This current induced in winding 7 biases the rectifying transistor 30 into a nonconducting state. The turns ratio of the windings 7 and 8 is selected so that the turn-off current in winding 7 is sufficient to overcome the effect of the flyback current in winding 6 and, in addition, supply a current large enough to rapidly dissipate the stored charge in the synchronous rectifying transistor 30 during the turn-off operation. At frequencies of operation exceeding 60 hertz it is necessary to positively dissipate the stored charge in the low saturation voltage transistor. Without the positive dissipation the transistor 30 is slow to turn off, hence the reverse current due to stored charge may short circuit the load causing undesirable high currents in the converter. The transformer 33 during the turn-off operation functions as a voltage transformer and supplies a sufficient voltage bias across the collector base junction of transistor 30 to keep it turned off.

The switching control circuit 50 which drives the primary switching transistors 10 and 20 removes the turn-off signal from transistor 35 simultaneously with the end of the conduction period of the switching transistor 10 corresponding to the rectifying transistor 30. With no current flowing through winding 8 the flyback current flowing through the winding 6 biases the synchronous rectifier transistor 30 back into conduction and the conduction cycle is repeated as described hereinabove. The synchronous rectifying transistor 40 conducting current $I_2$ operates in an identical manner and hence this operation is not described in detail herein.

The voltage regulation control 3 regulates the voltage appearing across the output load 90 by modulating the duty cycle of the primary switching transistors 10 and 20. As indicated hereinabove, the switching control circuit 50 in the absence of voltage regulation control signals operates to switch transistors 10 and 20 at some fixed maximum duty cycle. The switching control circuit 50 is designed to respond to overriding control signals generated by the voltage regulation circuitry on the output side of the converter. The overriding control signals are applied to the switching control circuitry via a pulse coupling device 55. The coupling device 55 may comprise any signal coupling transmission medium which will completely isolate the output side of the converter from the input side of the converter. A coupling device suitable for use herein is a pulse transformer.

The voltage regulation control on the output side comprises a modulated pulse generator 60, a comparator 65 and a reference voltage source 70, all of which are energized by power supplied by the auxiliary power supply 27 via lead 28. The auxiliary power supply 27 derives this power from winding 17 included on the core of the converter transformer 15. This power is always readily available to energize the voltage regulation control because, as described above, the primary switching transistors initially operate at some maximum duty cycle before the voltage regulation control takes effect. One input of the comparator 65 is coupled, via lead 66, to monitor the voltage across the output load 90. The reference voltage source 70 is connected to the other input. The comparator 65 generates a voltage error signal which is proportional to the differences between the reference voltage and the output voltage. This error voltage is applied to the modulated pulse generator 60.

The pulse generator 60 generates a pulse whose duration is a function of the error voltage. The unfiltered pulse output of the winding 16 is utilized to synchronize the pulse generator 60 so that its pulse output is fixed in a definite time relation to the switching of the primary switching transistors 10 and 20. The time duration of each modulated pulse generated by the pulse generator 60 begins with the synchronizing pulse derived from the transformer winding 16 of the converter and applied, via lead 61, to the pulse generator. The pulse coupling device converts this modulated pulse into a timed interval and at the end of the interval it transmits a short timing pulse. This timing pulse is applied to the override control input 52 of the switching control circuit 50. This timing pulse overrides the unregulated driving mode of the switching control circuit described above and is utilized to reduce the duty cycle of the switching transistors 10 and 20 to a value necessary to control the output voltage of the converter at its regulated value.

Figure 4:
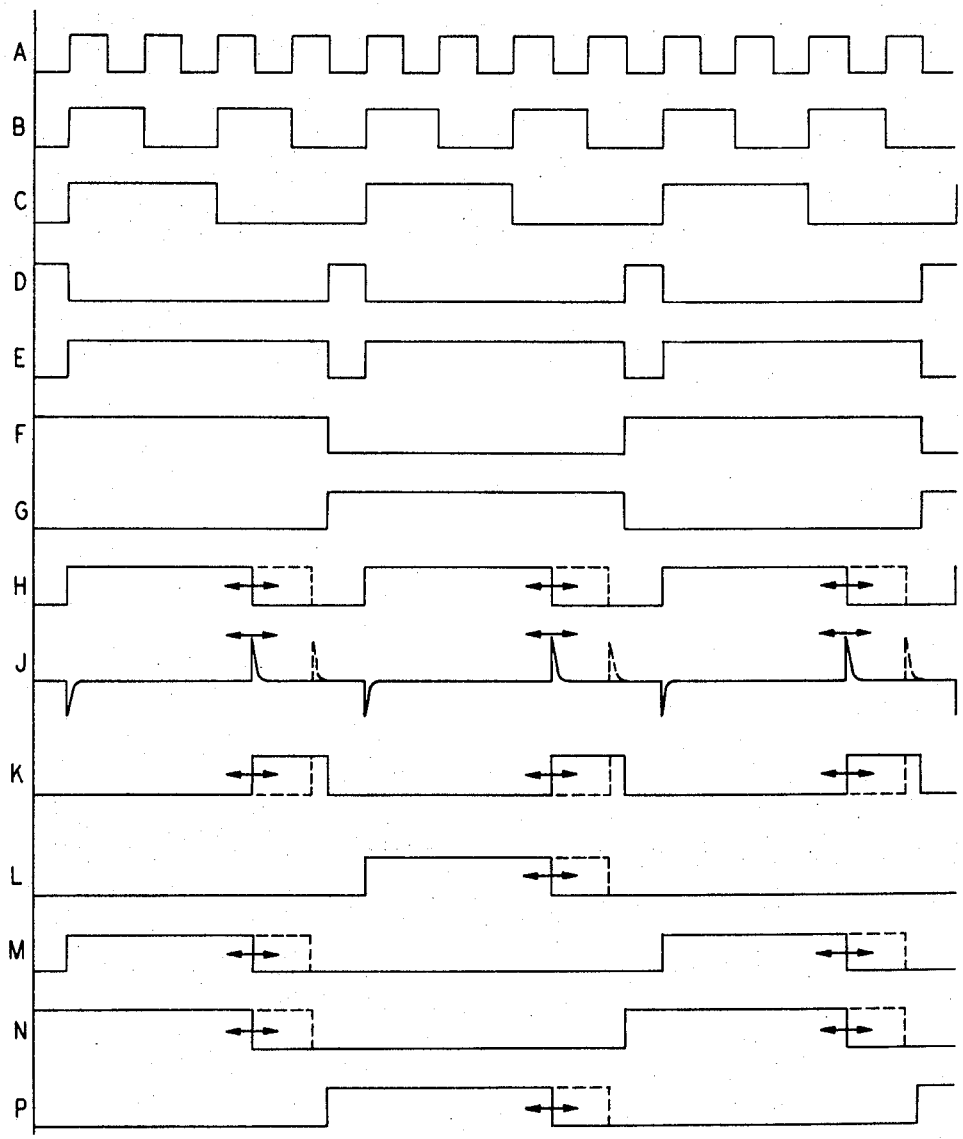
FIG. 4 shows voltage wave forms which assist in explaining the operation of the voltage regulation control.
Figure 3:
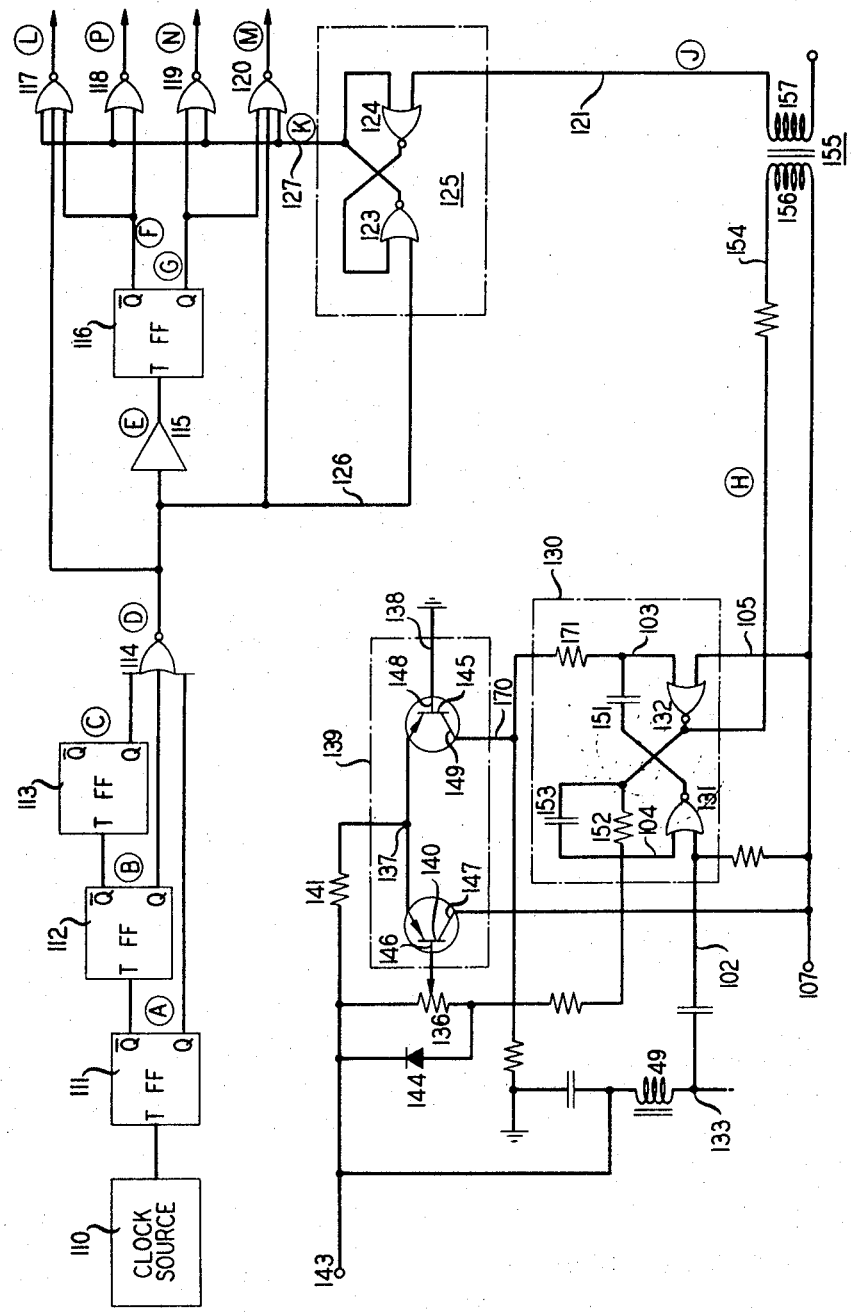
FIG. 3 is a detailed schematic and block diagram of the digital voltage regulation circuitry.

The control circuitry to regulate the output voltage of the converter is shown in detailed schematic and block diagram form in FIG. 3. Voltage waveforms to assist in explaining the operation of the voltage regulation control circuitry are shown in FIG. 4. The voltage regulation control is designed to provide closed loop voltage regulation control without upsetting the isolation between the input and output sides of the converter circuit. As described hereinabove, the switching control circuitry of the converter may be operated in a nonregulated mode independently of the voltage regulation control circuitry. The overriding signal output of the regulation control circuitry on the output side of the converter is synchronized with the switching of the primary switching transistors on the input side of the converter. The regulation control circuitry includes a modulated pulse generator 130 which generates a pulse signal whose duration is a function of the error of the output voltage from its regulated value. A synchronizing pulse signal initiated when a power switching transistor is turned on initiates the pulse output of the modulated pulse generator 130. The length of the pulse is controlled by an error signal generated by an error detector circuit 139. The modulated pulse signal is coupled, via a pulse transformer 155 to the input side of the converter and is utilized by the switching control circuitry therein to control circuitry therein to control the switching of the primary switching transistors.

The error detector circuit 139 compares the output voltage of the converter to a reference voltage. In response thereto, it generates an error voltage signal which is representative of the difference between the reference voltage and the converter output voltage. The reference voltage is generated by a voltage breakdown diode 144 energized by the output voltage of the converter coupled to terminal 143. The error detector circuit 139 comprises a differential amplifier including the emitter-coupled transistors 140 and 145. The output voltage of the converter at terminal 143 is coupled via resistor 141 to the common emitter junction 137 of the differential amplifier. The base electrode 146 of transistor 140 is connected to a potentiometer 136 which is shunted by the voltage breakdown diode 144. The base electrode 148 of the other transistor 145 is connected to the output circuit ground terminal 138. It is readily apparent that variations in the output voltage will cause variations in the respective currents conducted by transistors 140 and 145 and that these variations will be directly proportional to the error of the output voltage from its regulated value.

The collector 149 of the transistor 145 is connected to the modulated pulse generator 130 which comprises a logic circuit-type monostable multivibrator. The potential of collector 149 determines the pulse width of the monostable multivibrator. The monostable multivibrator comprises two cross-coupled NOR gates 131 and 132. One of the inputs 102 to NOR gate 131 is coupled to the unfiltered output of the converter rectifier at node 133 adjacent to the output filter inductor 49. The output of the NOR gate 131 is cross-connected, via capacitor 151, to an input 103 of NOR gate 132. The output of NOR gate 132 is cross-coupled via the parallel connected resistor 152 and capacitor 153 to the other input 104 of NOR gate 131. The second input 105 of NOR gate 132 is coupled to the auxiliary power source at terminal 107 as disclosed hereinabove with reference to FIG. 1. The operation of cross-coupled NOR gate multivibrator circuits is well known in the art, and it is not believed necessary herein to give a detailed general description of the operation of this circuit.

The output of the modulated pulse generator 130 is derived from the output of NOR gate 132 and coupled, via lead 154, to the primary winding 156 of the pulse transformer 155. The secondary winding 157 is connected to a bistable multivibrator 125 located on the input side of the converter. The bistable multivibrator 125, as described below, acts as an interface between the input and output side of the converter. It is periodically set via lead 126 in response to the clock source 110 which drives the switching control on the input side of the converter. It is subsequently reset in response to a spike pulse derived by pulse transformer 155 by differentiating the trailing edge of the output pulse of the modulated pulse generator 130. Hence, the bistable multivibrator 125 reconstructs the modulated pulse duration and applies it to the switching control on the input side of the converter to modulate the switching of the primary power switches.

The switching control circuitry on the input side of the converter comprises a clock source 110 which generates a train of pulses. The clock source 110 may comprise a unijunction relaxation oscillator or any other frequency source which can generate a frequency stable signal. Its pulse output is connected to three cascaded J-K flip-flops 111, 112 and 113 which are connected to operate in a toggle mode. The $\overline{Q}$ output of each J-K flip-flop is connected to the toggle input of the subsequent J-K flip-flop in the cascaded array. The Q outputs of all of the toggle J-K flip-flops are connected in parallel to a NOR gate 114.

The Q output signal of each of the J-K flip-flops is identified by the accompanying circles letter A, B and C and the voltage waveforms identified by the letter are shown in FIG. 4 which depicts the operating voltage waveforms. This pulse-generating arrangement generates a delay pulse having a short duration at the output of NOR gate 114 which is shown by waveform D in FIG. 4. This delay pulse is provided twice in each operating cycle of the converter to permit the synchronous rectifying transistors, discussed above with respect to FIG. 1, to revert to their blocking mode before a primary switch is turned on.

The output of the NOR gate 114 is applied to a signal polarity inverter 115. The output of the polarity inverter 115 is connected to the toggle input of the J-K flip-flop 116. The signal polarity inverter 115 maintains the output of NOR gate 114 at a 1 level between pulses and provides an 0 level output at well defined intervals in order to assure the accurate timing of the toggle pulses applied to the J-K flip-flop 116. The J-K flip-flop 116 in response thereto alternately applies enabling signals to NOR gates 117 and 118 and to 119 and 120. The output of the pulse source at NOR gate 114 is also connected directly to the NOR gates 117 and 120. The outputs of the NOR gates 117 and 120 are connected to drive circuits which control the switching of the primary switching transistors shown in FIG. 1. The outputs of the NOR gates 118 and 119 are connected to the current transformer windings described above with reference to FIG. 1 to supply the blocking signals to the synchronous rectifying transistors.

The error detector 139 monitors the magnitude of the output voltage of the converter by connecting the base electrodes of transistors 140 and 145 to a reference voltage and to the ground of the output voltage, respectively. The common emitter junction 137 of the differential amplifier is coupled to the regulated output voltage of the converter at terminal 143. The collector 147 of transistor 140 is connected to the auxiliary voltage supply utilized to energize the regulation control circuitry at terminal 107. The collector 149 of transistor 145 is connected, via lead 170 and resistor 171, to the timing capacitor 151 of the monostable multivibrator comprising the modulated pulse generator 130. The output of the modulated pulse generator 130 is a pulse with a controlled duration in which the leading and trailing edges of the pulse are differentiated by the pulse transformer 155 and coupled thereby to the input side of the converter.

The monostable multivibrator in the modulated pulse generator 130 is initially triggered by a signal which is derived from the output winding 16 of the converter power transformer. This pulse is initiated in the output winding of the converter transformer whenever one of the primary power switches is switched into a conducting condition. This pulse is coupled, via junction 133, to the input terminal 102 of the NOR gate 131. This switches the monostable multivibrator into its quasi-stable condition. The output of the monostable multivibrator at lead 154 in its quasi-stable condition assumes a 1 level. The output of the monostable multivibrator is shown by the waveform H in FIG. 4.

The waveform H in FIG. 4 comprises a solid line and a dotted line. The solid line shows the pulse duration under normal regulated operation of the converter. The maximum pulse duration indicated by the dotted line represents the initial mode of operation before the error sensing signal applied to the input of the monostable multivibrator reduces its quasi-stable state time.

The duration of the modulated pulse shown in waveform H is determined by the rate at which the capacitor 151 is charged by current flowing through the transistor 145. This current flow, in turn, is directly dependent upon the error of the output voltage. If the voltage at the output terminal exceeds the regulated value, the capacitor 151 charges at a faster than normal rate thereby reducing the duration of the modulated pulse output of the modulated pulse generator 130. Should the voltage output of the converter drop below its regulated value, the capacitor 151 charges much more slowly, thereby increasing the duration of the modulated pulse output of the modulated pulse generator 130.

The modulated pulse output shown by waveform H is applied, via lead 154, to the primary winding 156 of the pulse coupling transformer 155 which interconnects the input and output sides of the converter. The transformer 155 differentiates the modulated pulse producing two spike pulses at the secondary winding 157 of opposite polarity occurring respectively at the leading and trailing edges of the modulated pulse output of the modulated pulse generator 130. These spike pulses, shown as waveform J in FIG. 4, are the overriding signals which bring about the voltage regulation when coupled to the switching control on the input side of the converter. The solid and dotted lines of waveform J indicate the response to the solid and dotted lines of waveform H, respectively.

The clock source 110 and the cascaded J-K flip-flops 111, 112 and 113, described hereinabove, generate short duration pulses at a frequency which is a submultiple of the basic frequency of the clock source 110. This particular cascaded arrangement is used because it has superior noise immunity to other frequency generation arrangements, and in addition produces a pulse stream having better rise and fall times than the pulse output, for instance, of a monostable multivibrator.

The J-K flip-flop 116 operating in the toggle mode is utilized to control logic circuits which steer the drive and blocking signals applied to the primary switching transistors and the synchronous rectifying transistors. The opposite phase outputs of the J-K flip-flop 116 are shown by waveforms F and G in FIG. 4. The waveform F is applied to the NOR gates 117 and 118. The waveform G is applied to the NOR gates 119 and 120. It is apparent from the foregoing description that the NOR gates 117 and 118 will be enabled for the transmission of signals by the waveform F in phase opposition to the enabling of NOR gates 119 and 120 which are enabled by waveform G.

Each of the NOR gates 117, 118, 119 and 120 is coupled to the output of NOR gate 123 included in the bistable multivibrator 125. The bistable multivibrator 125 comprising the cross-coupled NOR gates 123 and 124 functions as an interface between the input and output sides of the converter control circuitry. Each pulse output of the NOR gate 114 applied to input lead 126 of NOR gate 123 triggers the multivibrator 125 into its set condition. The multivibrator 125 is triggered into its set condition at the start of the conduction interval of a primary switching transistor during each half cycle of operation. With the multivibrator 125 in its set condition the output signal of NOR gate 123 is applied, via lead 127, to the inputs of NOR gates 117, 118, 119 and 120. This signal as shown by waveform K in FIG. 4 is representative of a 0 level. This 0 signal level renders all of the output NOR gates 117, 118, 119 and 120 transparent to the transmission of the drive and blocking signals to the respective transistor controls.

The signals transmitted through the NOR gates 117, 118, 119 and 120 are shown by the waveforms L, P, N and M, respectively, in FIG. 4. The solid and dotted lines of the waveforms indicate the response to the corresponding solid and dotted lines of waveform H.

As described hereinabove, at the beginning of each conduction interval the modulated pulse generator 130 is triggered and produces a width modulated pulse which is responsive to the error of the output voltage. This pulse is differentiated by the coupling transformer 155 producing spike pulses of opposite polarity as shown by waveform J. The spike pulses appearing across output winding 157 are coupled to the reset input lead 121 of NOR gate 124 of the multivibrator 125. The multivibrator 125 is responsive to only the positive polarity of the spike pulse signals. The positive polarity spike pulse is the spike pulse corresponding to the trailing edge of the width modulated pulse. This trailing edge spike pulse resets the multivibrator 125 and changes the signal applied, via lead 127, to the NOR gates 117, 118, 119 and 120 to one representative of a 1 level. This 1 level signal shown by waveform K terminates signal propagation through the gates 117, 118, 119 and 120.

It is apparent from the foregoing that the primary switching transistors controlled through NOR gates 117 and 120 will have their drive signals terminated at a time interval proportional to the duration of the width modulated pulse output of the modulated pulse generator 130. The output of multivibrator 125 supplies the overriding signal modulating the primary switching transistors. In the absence of this overriding signal the primary switching transistors operate at some maximum duty cycle. The triggered output of multivibrator 125 blocks signal transmission through NOR gates 117, 118, 119 and 120 and modulates the duty cycle of the switching transistors by terminating the driving signals. This duty cycle modulation operation may be readily ascertained by examining the waveforms L, M, N and P in FIG. 4 which represent the outputs of NOR gates 117, 120, 119 and 118, respectively. The outputs shown by waveforms N and P are out of phase with the outputs L and M since these signals are alternately transmitted in response to the output of the J-K flip-flop 116 to provide the alternate phase switching of the converter.

It is apparent from the foregoing that the converter voltage output is regulated by a digital voltage regulation control which merely overrides the converter's unregulated mode of operation. Isolation between input and output is maintained by a pulse transformer-multivibrator interface in the voltage regulation feedback loop. Special circuit features permit the use of low saturation voltage rectifying transistors at high frequencies. While a specific illustrative embodiment has been disclosed, the principles of the invention may be used in other embodiments without departing from its spirit and scope.

What is claimed is:

1. A DC to DC converter comprising
    an inverter circuit including two oppositely phased switching devices and an inverter transformer coupled to the two switching devices,
    a rectifier coupled to the output of said inverter transformer and including two oppositely phased rectifying devices,
    a voltage regulation control coupled to monitor the rectified voltage output of said rectifier comprising a reference voltage source,
    means to compare said rectified voltage with said reference voltage and generate an error voltage therefrom,
    and pulse generation means to generate width modulated pulses responsive to said error voltage,
    switching control means to periodically switch said oppositely phased switching devices and generating a periodic switching signal output of fixed duration,
    gating means to couple the switching signal output of said switching control means to said oppositely phased switching devices,
    a bistable multivibrator having at least one output coupled to said gating means to apply transmission disabling signals thereto,
    means to periodically set said bistable multi-vibrator,
    a pulse transformer to differentiate the modulated pulse output of said pulse generation means generating at least pulse spikes corresponding to the trailing edge of said modulated pulse therefrom and intercoupling said pulse generation means to said bistable multivibrator whereby the bistable multivibrator is set in one state by said means to periodically set and reset in its other state by said pulse spike corresponding to the trailing edge of said modulated pulse wherein the reset output of said bistable multivibrator disables transmission through said gating means.

2. A DC to DC converter as defined in claim 1 wherein said rectifying devices comprise first and second rectifying transistors, first and second bias transformer associated with said first and second rectifying transistors respectively and each comprising
    a first winding connected to the collector of said rectifying transistor,
    a second winding connected to the base of said rectifying transistor and oriented with respect to said first winding to transform collector current into base drive current to turn on said rectifying transistor and a diode shunting the collector emitter path and poled in the forward current direction of said rectifying transistor and connected in series with said first winding, wherein current conducted by said diode is transformed into a base drive current to cause the turnon of said rectifying transistor.

3. A DC to DC converter as defined in claim 2 wherein said bias transformer includes a third winding connected to said switching control whereby said switching control applies turn-off signal to said third winding, said third winding having a turns ratio relation with said first winding to balance and overcome current transmitted by said diode in addition to supplying a reverse bias signal to said second winding to turn off said rectifying transistor.

4. A DC to DC converter as defined in claim 1 wherein said switch control means comprises a clock source, a plurality of cascaded toggle connected J-K flip-flops each driving the toggle input of the succeeding flip-flop with its first state output,
    a NOR gate, the second complementary state outputs of the plurality of cascaded flip-flops all being connected in parallel to said NOR gate and the output of said NOR gate being connected to said gating means.

5. A DC to DC converter as defined in claim 4 wherein said means to compare and generate an error voltage comprises an emitter coupled differential amplifier wherein the voltage to be monitored is coupled to the common emitter junction of the differential amplifier.

6. A DC to DC converter circuit comprising an inverter circuit including:
    a power transformer having a primary and a secondary winding,
    a pair of switching devices connected to said primary winding,
    output terminals coupled to said secondary winding,
    a voltage regulation means coupling the output terminals to said switching devices, said voltage regulation means comprising a switching control means connected to operate said switching devices, a pulse transformer connected between said output terminals and said switching devices to provide DC isolation therebetween, a reference voltage and a voltage error detector connected to said output terminals and generating an error signal proportional to the difference between the reference voltage and the voltage at said output terminals, means to generate a width modulated pulse whose duration is responsive to said error signal, means to synchronize the generation of said modulated pulse with the switching of said pair of switching devices, said means to generate a width modulated pulse coupling said output terminals to said pulse transformer wherein said pulse transformer differentiates said modulated pulse to produce a timing pulse therefrom, and said switching control means including a bistable multivibrator connected between said pulse transformer and said switching devices and responsive to said timing pulse, said multivibrator generating a second width modulated pulse having the same duration as said first width modulated pulse, to control the conductive duration of said switching devices.

7. A DC to DC converter as defined in claim 6 wherein said switching control means comprises a clock source, means to derive a periodic pulse from said clock source at a lower frequency, and gating means to couple said periodic pulse to drive said switching means and means to connect said multivibrator to said gating means whereby said gating means is disabled in response to said timing pulse.

8. A DC to DC converter as defined in claim 6 wherein a rectifier including first and second oppositely phased synchronous rectifying transistors interconnects said secondary winding to said output terminal, first and second proportional transformer base drive arrangement to drive said first and second synchronous rectifying transistors, each of said proportional transformers including a first winding connected to the collector of said rectifying transistor, a second winding connected to the base of said rectifying transistor, whereby the collector current is transformed into a base drive current, a diode shunting the collector emitter path of said rectifying transistor and poled in the direction of the forward current flow of the rectifying transistor and connected in series with said first winding whereby current conducted by said diode is transformed into a base drive current.

9. A DC to DC converter as defined in claim 8 wherein said proportional transformer further includes a third winding coupled to said switching control to apply turn-off signals to said rectifying transistor.

* * * * *